United States Patent Office 3,400,162
Patented Sept. 3, 1968

3,400,162
PREPARATION OF MYRCENE HYDROBROMIDES
Muus G. J. Beets and Wilhelmina Meerburg, Hilversum, Netherlands, assignors to International Flavors & Fragrances I.F.F. Netherlands N.V., Zaandam, Provincialeweg, Netherlands, a corporation of the Netherlands
No Drawing. Filed Mar. 31, 1965, Ser. No. 444,419
9 Claims. (Cl. 260—601)

ABSTRACT OF THE DISCLOSURE

A process for the hydrobromination of myrcene to selectively direct the hydrobromide addition to the conjugated double bonds of the myrcene molecule rather than the isolated double bond characterized by conducting the reaction at a temperature of from about 60° C. to about 120° C. and preferably at from about 75° C. to about 105° C.

---

This invention relates to a novel process for the preparation of myrcene derivatives, and more particularly, it relates to the preparation of myrcene hydrobromides which are rich in geranyl, neryl, and linalyl bromides and have only small quantities of myrcenyl bromide and terpenyl bromide.

The geranyl, neryl, and linalyl bromides are highly desirable starting materials which can be readily converted by known methods into useful and important perfume components such as geraniol and geranyl esters, and linalool and linalyl esters, and citral.

It is known that myrcene (2-methyl-6-methylene-2,7-octadiene) adds hydrogen halides (represented by HX) to form mixtures of monohydrohalides the most important of which are:

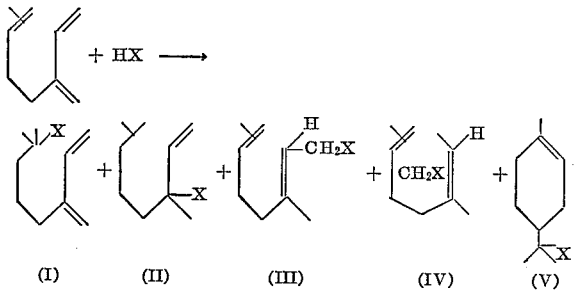

The formation of (I), myrcenyl halide (2-halo-2-methyl-6-methylene-7-octene) can be explained by simple 1,2-addition of HX to the isolated double bond, and the formation of (II), (III), and (IV), linalyl, geranyl, and neryl halides respectively, can be explained by 1,2- and 1,4-addition to the conjugated double bond system of the myrcene molecule.

α-Terpinyl halide (V) is formed either by direct ring closure of the carbonium ion VI according to:

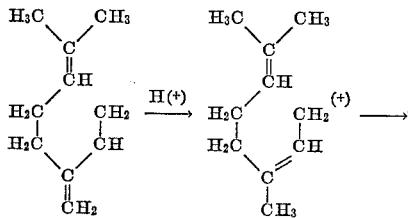

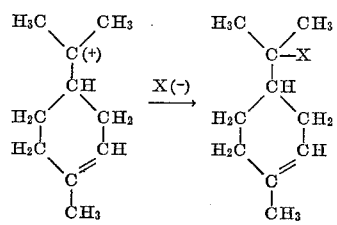

or by subsequent cyclization of the linalyl halide, neryl halide, or geranyl halide first formed.

For instance R. Fornet in Seifensieder Zeitung 63, 740 (1936), quoting R. Knoll and A. Wagner, Synthetische und Isolierte Riechstoffe, 2nd ed., p. 211, describes the hydrochlorination of terpenes, recovered from the acetylation of linalool with dry HCl in benzene, followed by conversion with dry sodium acetate to a mixture of acetates, containing linalyl acetate. U.S. Patent No. 2,609,388 to R. L. Knapp et al. describes the hydrohalogenation of myrcene with approximately equimolar amounts of HCl or HBr, preferably at low temperatures of 0° to 50° C. under anhydrous conditions. The yield however is low, as judged from the experiments cited in the said patent. Thus, a yield of 44 grams of impure geranyl acetate was obtained from 200 grams of a β-pinene pyrolysate containing about 60% myrcene, i.e., the monohydrochloride obtained in a yield of about 66% in the same experiment must consist mainly of monohydrohalides other than geranyl or neryl chloride. In the case of hydrobromination the yield is even lower. Essentially the procedure is mentioned in U.S. Patent No. 2,794,826 to A. Bell et al.

Moreover, a number of patents, for example U.S. Patents 2,882,323, and 3,016,408 and British Patent No. 896,262 relating to the hydrohalogenation of myrcene in the presence of copper catalysts, such as metallic copper and cuprous and cupric compounds, have appeared. In all of the aforecited literature the hydrohalogenation of the myrcene is carried out at low temperatures. For example U.S. Patent 2,882,323 gives a preferred temperature of —10° to —3° C. for hydrogen chloride. British Patent No. 896,262 shows a temperature range of —25° to 100° C. for hydrochlorination, and a preferred temperature range of —10° to 40° C. is shown. This British patent states that higher reaction temperatures tend to cause side reactions, and the examples show hydrochlorination carried out at temperatures in the range of from about 7° to 25° C. and hydrobromination carried out at from —20° to 25° C.

U.S. Patent 3,016,408 shows a preferred temperature between —10° and 30° C. and states that at temperatures substantially above 50° C. undesirable side reactions can take place. Likewise, in U.S. Patent 2,609,388, hydrohalogenation is carried out at temperatures from 0° to 50° C. without a catalyst, and specific temperatures of 10° to 15° C. are set out for hydrobromination and temperatures of up to 35° C. for hydrochlorination in the examples.

In the course of making this invention it was found that the uncatalyzed hydrochlorination of myrcene at higher temperatures than shown in the art becomes extremely slow and produces a mixture of monohydrochlorides in low yield. Moreover, the isomer distribution in the product is very poor and unfavorable, that is, the product contains a large proportion of myrcenyl chloride and α-terpinyl chloride. These latter two chlorides are not nearly as useful in the production of perfume constituents as are other isomers.

This invention provides a method for the hydrobromination of myrcene which gives high yields of geranyl, neryl, and linalyl bromides.

Other and further objects, features and advantages will clearly appear from the detailed description given below.

The process of this invention rests on the surprising discovery that hydrobromination of myrcene utilizing approximately equimolar amounts of hydrogen bromide and myrcene at elevated temperatures rapidly produces the desired mixture of monohydrobromides in good yield. The use of the higher temperature is of paramount importance in achieving a reaction product rich in neryl and geranyl bromides. Generally, the preferred temperature for the hydrobromination process of this invention lies in the range of from about 60° to about 120° C.

This invention accordingly comprises the novel processes and steps of processes specific embodiments of which are described hereinafter by way of example and in accordance with which we now prefer to practice the invention.

It has been found that below a temperature of about 60° C. the reaction rate and the yield decrease, and larger amounts of the undesired myrcenyl and α-terpinyl bromides are obtained. On the other hand, at temperatures substantially higher than about 120° C. the yield also decreases, and increasing quantities of unwanted by-products are formed. It is preferred to carry out the process of this invention at temperatures in the range of from about 70° to about 105° C.

The high-temperature hydrobromination process of this invention can be carried out either with or without a solvent. It will be understood that when a solvent is used, it can be any solvent which does not itself react with hydrogen bromide. In carrying out the process of this invention it is preferred to utilize a non-polar solvent such as benzene or hexane.

The hydrogen bromide used in the process of this invention can be either anhydrous or in the form of aqueous solutions of hydrogen bromide. It will be understood that where aqueous solutions having various concentrations of hydrogen bromide are used, they can be used in conjunction with an inert solvent or they can be used without a solvent. The use of aqueous solutions of hydrogen bromide is particularly preferred since aqueous solutions of hydrogen bromide can be more easily and more cheaply recovered from waste solutions of bromide salts, for example sodium bromide or potassium bromide, after the conversion of myrcene hydrobromides into oxygenated derivatives than can anhydrous hydrogen bromide.

The hydrobromination of this invention proceeds very well without the presence of any catalyst. In many cases yields can be improved and the reaction velocity can be considerably increased when the hydrobromination is carried out in the presence of certain initiators. Accordingly, it is preferred to carry out the process of this invention in the presence of known free radical-forming initiators. Especially suitable in the practice of this invention are the organic peroxide-type of free radical-forming initiators. Examples of such organic peroxides are di(t-butyl)peroxide and dibenzoyl peroxide. The free radical initiation can also be effected by irradiation with ultraviolet light, and such irradiation likewise results in higher yields and a greater rate of reaction.

It will be understood that the process of this invention can be carried out batchwise, semi-continuously, or continuously. For example, the reaction can be carried out continuously in a tubular reactor with a concurrent flow of the reactants.

Pure or highly purified myrcene can be used as a starting material in the practice of this process. Crude myrcene obtained by pyrolysis of β-pinene can also be used with excellent results. Such a crude myrcene usually contains from about 60 to about 80% of myrcene, with the balance being chiefly limonene together with smaller amounts of α- and β-pinene.

The reaction products can be analyzed by using a combination of spectrophotometric techniques, gas-liquid partition chromatography, and saponification value. These methods permit an accurate determination of the various bromides produced. Moreover, the quality of the reaction mixture of the hydrobromides obtained is determined by well-known techniques of oxidation to citral, that is, by treatment with an alkali-metal salt of a nitronic acid, as for example the technique shown in British Patent No. 803,765.

It has been found that the hydrobromination process of this invention produces a highly stable reaction product. The hydrobromination mixture can be kept for at least three weeks at room temperature without showing any sign of deterioration, as determined by the aforementioned analytical technique. Indeed, the oxidation of three week-old reaction product following the technique of British Patent No. 803,765 produced a yield of citral exactly the same as that obtained immediately after the hydrobromination. Moreover, it has been found that this process is further advantageous because the crude hydrobromination reaction products need no further treatment prior to conversion into oxygenated derivatives such as citral, geraniol, linalool, and their esters. If desired, the hydrobromination reaction mixture can be fractionated to separate any unconverted hydrocarbons and dibromides from the monobromides. It is preferred to utilize the crude hydrobromination reaction mixture as such because the hydrogen bromide can be recovered substantially quantitatively without loss of the hydrogen bromide or bromide ions, as the case may be.

The following examples are set forth to illustrate some embodiments of this invention and not to define its scope, the scope of this invention being determined by the claims appended hereto.

EXAMPLE I

An 897 grams amounts of β-pinene pyrolysate containing 75.8% myrcene (5 moles of myrcene) is heated to a temperature of 90° C., and 446 grams (5.5 moles) of anhydrous hydrogen bromides is passed into the pyrolysate over a 3¾ hour period. During the addition of the hydrogen bromide the temperature is maintained between 90° and 93° C. After the addition of the hydrogen bromide is completed, the mixture is stirred for another 15 minutes and cooled to room temperature.

Spectrophotometric and gas-liquid partition chromatographic analyses indicate that 80% of the mycrene is converted into the desired monobromides, namely, the geranyl, neryl, and linalyl bromides. Oxidation of the crude myrcene hydrobromide reaction product with the potassium salt of 2-nitropropane in methanol yields 54.7% of the theoretical amount of citral, based on myrcene.

A number of additional experiments are carried out in accordance with the procedure of Example I, but with different temperatures. The yields of citral, based on the myrcene, are set forth in Table I below.

TABLE I

| Temperature (° C.) | Yield of citral (percent of theory based on myrcene) |
| --- | --- |
| 3–4 | 23.5 |
| 41–45 | 33.8 |
| 50–66 | 38.1 |
| 81–85 | 52.3 |
| 90–93 | 54.7 |
| 98–104 | 50.1 |
| 119–123 | 36.2 |

EXAMPLE II

Following the procedure of Example I, 1070 g. (13.2 moles) of anhydrous hydrogen bromide is passed into 2153 g. of β-pinene pyrolysate containing 75.8% of myrcene over a period of 3½ hours. The temperature is maintained at 90–93° C.

The crude reaction product in the amount of 3219 g. is obtained and divided into two equal parts. The first portion is oxidized immediately with the potassium salt of 2-nitropropane to citral, and a yield of 53.8% of theoretical is obtained. The other portion is maintained at room temperature for three weeks and then oxidized to citral according to the same procedure. A yield of 56.9% of theoretical is obtained.

EXAMPLE III

Anhydrous hydrogen bromide in the amount of 223 grams is passed into a mixture of 425 grams β-pinene pyrolysate containing 80.7% myrcene and 15 grams of di(t-butyl)peroxide at a temperature of 80–85° C. over the course of two hours. The reaction mixture is then washed with dilute sodium bicarbonate solution and the 638 grams of washed product so obtained is oxidized according to the procedure described in Example I. Citral is obtained in a yield of 54.7% of theoretical, based on myrcene.

A number of experiments are carried out in the same manner as described in Example II but utilizing different temperatures and introduction times. The results are shown in Table II.

TABLE II

| Temperature (° C.) | Hydrogen bromide introduction time (hrs.) | Yields of citral (percent of theory based on myrcene) |
|---|---|---|
| 3–5 | 7 | 30.1 |
| 39–41 | 6 | 36.8 |
| 60–63 | 4 | 47.5 |
| 80–85 | 2 | 54.7 |
| 100–103 | 4 | 54.1 |
| 119–123 | 2 | 44.3 |

EXAMPLE IV

In the presence of irradiation emitted by a Hanau quartz ultraviolet lamp, Type S81, 230 grams of anhydrous hydrogen bromide are passed into 428.5 grams of β-pinene pyrolysate, containing 79.4% myrcene, over a 4-hour period, during which the temperature of the reaction mixture is kept at 60°–62° C.

The reaction product is oxidized as in Example I, and 48.0% of the theoretical yield of citral, based on myrcene, is obtained. When the same experiment is performed at temperatures of from 0° to 3° C., the citral yield is only 30.2% of theoretical.

EXAMPLE V

Into a reaction flask equipped with stirrer, thermometer, dropping funnel, and water separator, is placed 450 grams of β-pinene pyrolysate containing 75.8% of myrcene. Over a period of four hours there is added at a flask temperature of 80° to 95° C. and a pressure of 150 mm. Hg., with simultaneous removal of water 415 grams of a 60% aqueous hydrogen bromide solution.

The reaction mixture is then cooled to room temperature and washed with water.

The washed reaction product is oxidized according to the technique described in Example I, affording citral in a yield of 43.1% of theoretical, based on myrcene.

EXAMPLE VI

During a 4.5-hour period 223 grams of anhydrous hydrogen bromide is passed into a refluxing solution of 431 grams of β-pinene pyrolysate, containing 78.5% of myrcene and 500 ml. of benzene. The temperature of the refluxing mixture rises slowly from 93° to 96° C. during the course of the reaction.

The reaction product so obtained is washed with a dilute sodium carbonate solution, and the 1086 grams of washed product is oxidized according to the technique described in Example I. Citral is obtained in a yield of 51.2% of theoretical, based on myrcene.

EXAMPLE VII

A continuous hydrobromination process can be used to obtain yields of the desired mixture of geranyl bromide, linalyl bromide, and neryl bromide as good as are obtained in Example I. Into the top of a 40 cm. high glass column having a 36 mm. diameter and filled with Berl saddles is introduced 515 g./hr. of β-pinene pyrolysate, containing 78.5% of myrcene. Provision is made for external heating of the glass column. A concurrent stream of anhydrous gaseous hydrogen bromide is simultaneously introduced into the top of the column at a rate of 121.5 g./hr. An additional 121.5 g./hr. of anhydrous gaseous hydrogen bromide is introduced into the point of the column to flow concurrently with the pyrolysate and hydrogen bromide introduced into the top of the column. The reaction product is continuously removed at the bottom of the reactor column.

Upon oxidization of the reaction product, yields of citral equally as good as those obtained in the batch process of Example I are found.

What is claimed is:

1. A process for the hydrobromination of myrcene which comprises reacting myrcene with hydrogen bromide at temperatures in the range of from about 60° C. to about 120° C.

2. A process for the hydrobromination of myrcene which comprises reacting myrcene with hydrogen bromide at temperatures in the range of from about 75° C. to about 105° C.

3. The process of claim 1 wherein an aqueous solution of hydrogen bromide is used.

4. The process of claim 1 wherein a free radical-forming initiator is used to catalyze the reaction.

5. The process according to claim 4 wherein the initiator is an organic peroxide.

6. The process of claim 5 wherein the organic peroxide is selected from the group consisting of di(t-butyl)-peroxide and dibenzoyl peroxide.

7. The process of claim 1 wherein the mixture of hydrogen bromide and myrcene is irradiated with ultraviolet light.

8. A process for the hydrobromination of myrcene which comprises reacting myrcene with hydrogen bromide at temperatures in the range of from about 60° C. to about 120° C. and oxidizing the resulting bromide composition in the presence of an alkali-metal salt of a nitronic acid to produce citral.

9. A process for the hydrobromination of myrcene which comprises reacting myrcene with hydrogen bromide at temperatures in the range of 75° C. to about 105° C. and oxidizing the resulting bromide composition in the presence of the potassium salt of 2-nitropropane to produce citral.

References Cited

UNITED STATES PATENTS 3,005,845 10/1961 Bain _____ 260—489
2,902,515 9/1959 Montavon et al. _____ 260—601

BERNARD HELFIN, *Primary Examiner.*

R. H. LILES, *Assistant Examiner.*